United States Patent [19]

Krueger

[11] Patent Number: 4,474,063
[45] Date of Patent: Oct. 2, 1984

[54] MEASURING AMOUNT OF BULK MATERIALS CONTAINED IN STORAGE TANKS

[76] Inventor: Rudolph E. Krueger, 1201 Dolphin Ter., Corona Del Mar, Calif. 92625

[21] Appl. No.: 381,931

[22] Filed: May 26, 1982

[51] Int. Cl.³ .......................... G01F 23/16; G01L 1/02
[52] U.S. Cl. ..................................... 73/302; 73/862.58
[58] Field of Search ..................... 73/290 R, 296, 299, 73/302, 862.58, 301; 177/132, 208

[56] References Cited

U.S. PATENT DOCUMENTS

| | | | |
|---|---|---|---|
| 1,596,774 | 8/1926 | Star | 73/302 |
| 2,493,012 | 1/1950 | Moore et al. | 73/862.58 X |
| 2,593,906 | 4/1952 | Markson | 73/862.58 X |
| 2,649,714 | 8/1953 | Griffith, Jr. | 73/299 |
| 3,374,677 | 3/1968 | Corp et al. | 73/862.58 X |

*Primary Examiner*—Charles A. Ruehl
*Attorney, Agent, or Firm*—Christie, Parker & Hale

[57] ABSTRACT

A load cell in the bottom of a storage tank measures the weight of bulk material contained in the tank. The load cell has a flexible diaphragm to which the weight of the bulk material is applied. The flexible diaphragm moves down away from a neutral no-load position under the weight of the bulk material applied to it. A source of fluid under pressure is connected to a cavity in the load cell housing on a side of the diaphragm opposite the side that senses the weight of the bulk material. Fluid pressure is supplied to the cavity in an amount that causes the diaphragm to move to its neutral position, balancing the load applied to the diaphragm from the bulk material. A control valve senses when the diaphragm returns to its neutral position to interrupt fluid pressure supplied to the cavity. A pressure gauge coupled to the cavity senses the amount of fluid pressure required to balance the load. A reading is taken from the pressure gauge when the load applied to the diaphragm is balanced. In one embodiment, the pressure gauge is calibrated to read in feet of bulk material, which can be converted to a weight measurement knowing the cross-sectional area of the tank and the density of the material.

3 Claims, 5 Drawing Figures

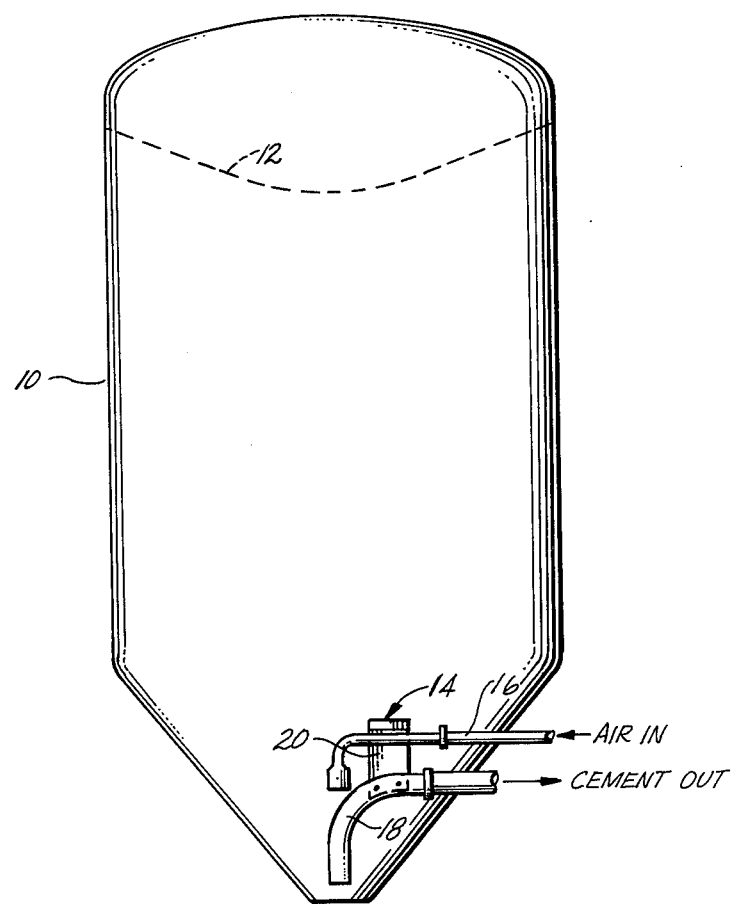

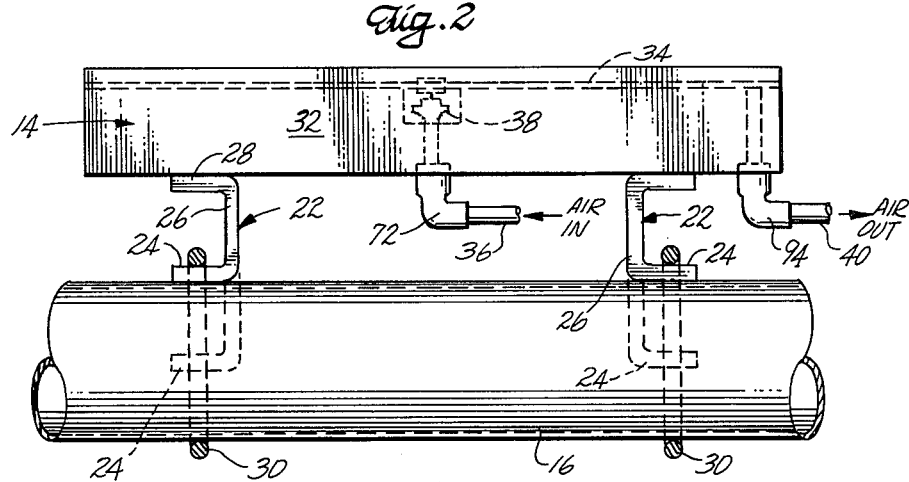
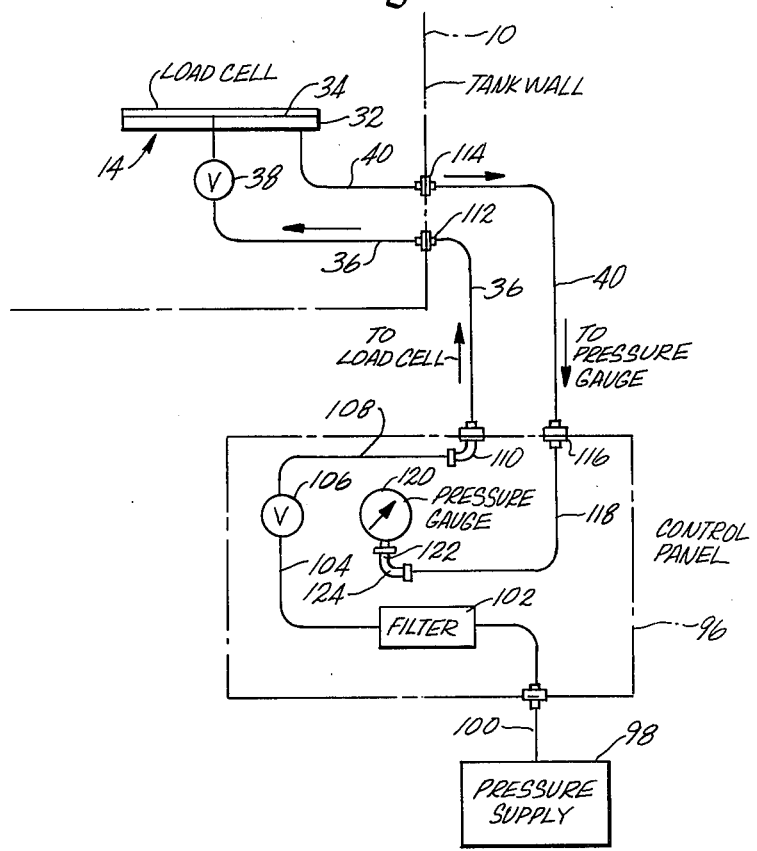

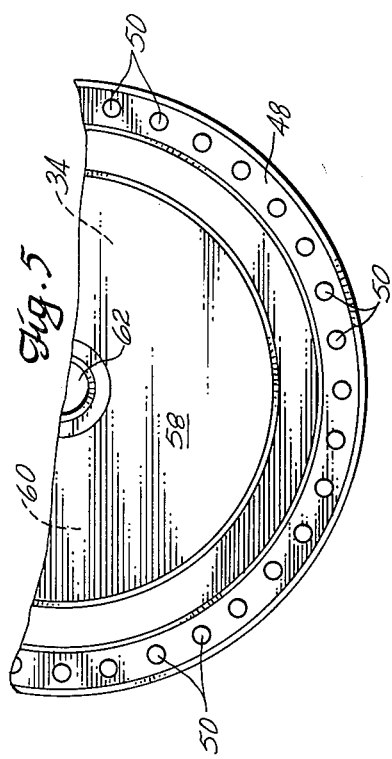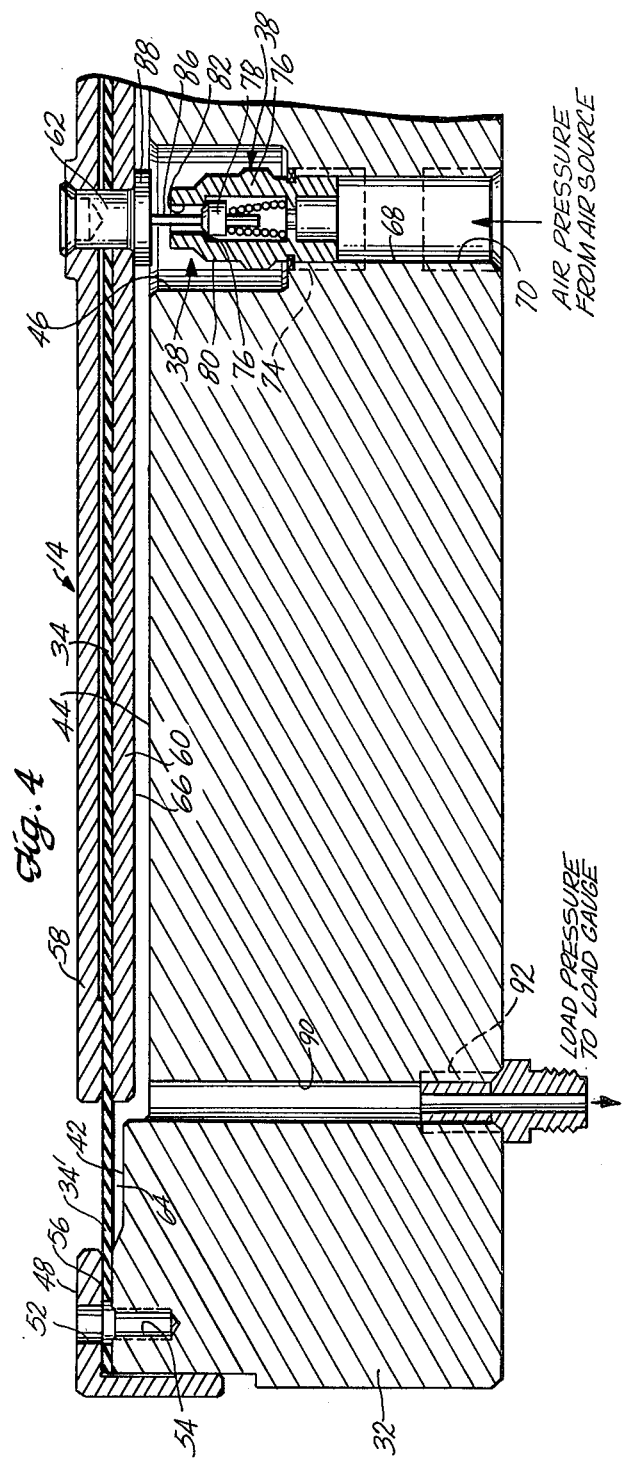

MEASURING AMOUNT OF BULK MATERIALS CONTAINED IN STORAGE TANKS

BACKGROUND OF THE INVENTION

1. Field of the Invention

This invention relates to measuring the amount of a bulk material contained in a storage tank or the like.

2. Description of the Prior Art

There is a need to quickly and accurately measure the amount of a bulk material contained in a storage tank. Of particular concern are granular or particulate types of bulk materials, such as dry cement, sand, barite (drilling mud), flour, grain, etc.

Materials such as dry cement and barite are commonly used in bulk in the oil well drilling industry. It is often necessary to measure the weight or volume of such bulk materials on a floating rig, such as an offshore drilling ship or platform. For example, in offshore drilling there is a need to measure whether a storage tank on a platform contains enough cement before a new job is started, in order to avoid running out of material in the middle of the job.

In one method currently used for measuring the contents of storage tanks, a worker manually measures the remaining height of the material by climbing a ladder to the top of the tank, opening the tank, and dropping in a calibrated rope with a paddle or "stop" on the end. The length of the rope indicates the level of the material remaining in the tank, and this measurement can be used to figure the height, volume or weight of material remaining in the tank. Objections to this method are the inconvenience, lack of safety, and time-consuming nature of the task.

In another technique currently used for measuring the contents of a storage tank, the entire tank is mounted on "load cells" in the form of strain gauges on the feet of the tank. The tank is measured both empty and with a load, and the weight of the contents is the difference between the two weight measurements. One objection to this method is that the tank must be completely supported by the "load cell" system. No stiffness can be permitted in the connected plumbing, or other attachments, or a weighing error will result. Instead, flexible joints must be used, and the total cost of implementing such a system is several thousands of dollars. Use of the tank supported by such "load cells" may be suitable for fixed installations, but it is not suitable for use on movable installations, such as offshore drilling ships, semisubmersibles, or other non-static platforms. The accelerations and changes in center of gravity from wave action and the like cause errors for which compensation is difficult.

SUMMARY OF THE INVENTION

Briefly, this invention provides a load cell placed in a lower portion of a storage tank for measuring the amount of a bulk material contained in the tank. The load cell includes a flexible diaphragm supported so as to change position under a "hydrostatic", or equal load from the bulk material on the diaphragm. Fluid pressure is applied to the diaphragm in opposition to the load on the diaphragm from the bulk material. This causes the diaphragm to change position to oppose the load from the bulk material. The amount of fluid pressure applied to the diaphragm is directly proportional to the load of the bulk material on the diaphragm; and this amount of fluid pressure is sensed and provided as a measurement of the amount of the bulk material contained in the storage tank. The measurement can be an indication of the weight, volume or height of the bulk material contained in the tank.

In one embodiment of the invention, the diaphragm has a neutral or balanced position, and the pressure applied to the diaphragm in opposition to the load is the amount of pressure required to return the diaphragm to its balanced position. A source of fluid pressure is applied to the diaphragm through a control valve which senses when the diaphragm has moved to its balanced position. The control valve then stops the supply of fluid pressure to the diaphragm. The amount of fluid pressure required to balance the diaphragm is measured by a pressure gauge which can be calibrated in units of measurement proportional to the weight, volume, or height of material contained in the tank.

Thus, in order to determine the weight of the bulk material remaining in the tank, the fluid pressure source is activated to supply pressure to the load cell for pressurizing the cell to balance the diaphragm. The pressure buildup in the load cell is immediate, after which a reading can be quickly taken to determine the amount of material contained in the tank. The system is reasonably inexpensive and avoids the safety hazard inherent in a worker climbing a ladder to the top of a large storage tank. The load cell system is particularly useful in measuring materials contained in tanks on offshore drilling ships or platforms, because the measurements are accurate without being subject to error caused by accelerations or other movements of the installation on which the tank and load cell are mounted.

These and other aspects of the invention will be more fully understood by referring to the following detailed description and the accompanying drawings.

DRAWINGS

FIG. 1 is a fragmentary, semi-schematic side elevation view illustrating a storage tank containing a load cell according to principles of this invention;

FIG. 2 is a fragmentary, semi-schematic side elevation view illustrating means for mounting the load cell in the bottom of a storage tank;

FIG. 3 is a schematic diagram of a fluid pressure control system for the load cell;

FIG. 4 is a fragmentary, cross-sectional view showing a portion of the load cell; and FIG. 5 is a fragmentary top plan view of the load cell illustrated in FIG. 4, the view of FIG. 5 being reduced in size compared to FIG. 4.

DETAILED DESCRIPTION

FIG. 1 schematically illustrates a storage tank 10 containing a fluid-type bulk material. The top level of the bulk material contained in the tank is shown at 12, with its typical angle of repose. The storage tank can contain dry particulate or granular type materials of the types described above. These are fluid type materials capable of being transported or pumped by means of pumps or air pressure. In one embodiment, the storage tank 10 contains dry cement for use in offshore drilling, and the tank is mounted on a floating drilling ship or offshore platform such as a non-static platform (not shown).

A load cell 14 is mounted in a lower portion of the tank on a suitable support. In the embodiment of FIGS. 1 and 2, the load cell is rigidly mounted on a 3-inch diameter airpipe 16 extending into a lower portion of the tank. The airpipe supplies air to the lower portion of the tank for pumping the material. The airpipe, in turn, is rigidly supported within a lower portion of the tank on a rigidly mounted delivery pipe 18 used in pumping dry cement (or other bulk material) out of the tank. The airpipe is rigidly mounted above the delivery pipe 18 by a bracket 20 rigidly affixed to the delivery pipe 18. The intake end of the delivery pipe 18 is located near the bottom central portion of the tank, and the airpipe extends to a point close to the central (vertical) axis of the tank immediately above the delivery pipe. The load cell is mounted on the airpipe in a laterally offset position between the central axis of the tank and the side wall of the tank. Hence, the height of the material in the tank above the load cell is a somewhat average height of the contents owing to its angle of repose.

As shown best in FIG. 2, the load cell 14 is affixed to the airpipe 16 by a pair of brackets 22. Each bracket has a rounded, flanged lower portion 24 that rests on the rounded upper portion of the airpipe. Each bracket tapers wider upwardly toward the load cell, so that the narrow upright web portion 26 of each bracket is of generally inverted triangular shape when viewed from the side of FIG. 2. Each bracket has a long, flat upper flange portion 28, and opposite sides of the load cell are affixed to these flanged portions of the brackets. A pair of clamps such as hose clamps 30 extend around the airpipe and around the flanged lower portion 24 of each bracket for rigidly affixing the lower portions of the brackets to the airpipe. This holds the load cell in a horizontal position spaced a short distance above the airpipe.

FIG. 2 schematically illustrates portions of the load cell, which includes a circular housing 32 having its vertical axis spaced laterally from and parallel to the central axis of the tank. A flexible diaphragm 34 (described in greater detail below) is mounted horizontally across the upper portion of the load cell housing. Air from a remote pressure source is introduced into the center of the load cell housing through an air pressure supply line 36. A normally open control valve 38 (described in greater detail below) in the air pressure supply line controls the supply of air pressure to the underside of the diaphragm. An air pressure return line 40 adjacent the periphery of the housing returns the air pressure from the underside of the diaphragm to a pressure gauge, described below.

Detailed construction of the load cell is best understood by referring to FIGS. 4 and 5. The flexible diaphragm is a circular neoprene rubber sheet. In one embodiment, the flexible diaphragm is 0.093 inch thick and approximately 11¾ inches in diameter. The housing 32 has a recessed top surface having a shallow annular outer shoulder 42 which is stepped down to a large circular recess 44 covering most of the top face of the housing. A circular passage 46 extends downwardly from the recess 44 along the central axis of the housing.

The flexible diaphragm is affixed to the housing so as to cover the recessed top face of the housing. An annular L-shaped retainer ring 48 fits over the outer top corner of the housing and over the outer peripheral portion of the circular diaphragm. Fasteners such as screws 50 secure the outer peripheral portion of the diaphragm to the housing. The top flange of the retainer ring 48 has a series of equidistantly spaced apart holes 52 aligned with threaded bores 54 circumferentially spaced apart around an annular outer lip 56 at the periphery of the housing. In one embodiment, there are 36 of the screws 50, each of which fits through the holes 52 in the retainer ring and is threaded into a corresponding threaded bore 54 and tightened against the retainer ring to sandwich the outer portion of the diaphragm between the retainer ring and the outer lip of the housing.

A pair of large circular, flat, thin, upper and lower retainer plates 58 and 60 sandwich the upper central portion of the flexible diaphragm. Each retainer plate is approximately ⅛-inch thick and 9 inches in diameter for a 12-inch diameter load cell body. A fitting 62 at the center of the diaphragm affixes the upper and lower retainer plates in their overlying positions against the top and bottom faces of the diaphragm. The weight of the bulk material acts downward principally on the upper retainer plate 58. The outer edge of the upper retainer plate is spaced inwardly from the inner edge of the outer retainer ring 48, leaving an annular portion 34' of the flexible diaphragm exposed to the load from the bulk material. This annular portion 34' of the diaphragm is located above the shallow, annular recess 42 in the top face of the housing. The large recessed portion 34 in the top face of the housing accommodates the lower retainer plate 60. A narrow open space or cavity is left between the underside of the diaphragm and the recessed top surface of the housing. This cavity includes a narrow void space 64 below the annular exposed portion 34' of the diaphragm; a narrow, large-diameter void space 66 below the principal portion of the diaphragm and the lower retainer plate; and the space within the central passage 46 below the center of the diaphragm. This combined void space will be referred to herein as the "diaphragm volume".

An air pressure supply passage 68 drilled in the center of the housing opens into the bottom of the central passage 46. An internally threaded portion 70 is adapted to receive an elbow fitting 72 (see FIG. 2) for connecting the air pressure supply line 36 to the central passage 68 in the housing. The control valve 38, shown best in FIG. 4, is mounted in the passage 46 and coupled to an internally threaded portion 74 of the air pressure supply passage 68, for controlling the supply of air pressure to the diaphragm volume at the underside of the diaphragm. The control valve 38 has a valve housing 76 located in the central passage 46 below the fitting 62 at the center of the diaphragm. A movable valve body 78 inside the housing closes on an annular valve seat 80 in the housing for normally closing a passage 82 through the valve housing. A coil spring 84 is biased against the bottom of the valve body for normally biasing the valve body into its closed position against the valve seat 80. An elongated stem 86 affixed to the valve body extends above the valve housing and in contact with a flanged lower portion 88 of the diaphragm fitting 62. Thus, as the diaphragm moves downwardly under a load from the bulk material, the flanged portion 88 of the fitting 62 applies a downward force to the stem 86 which, in turn, moves the valve body 78 downwardly away from the valve seat 80, against the bias of the control spring 84, for opening the passage 82 through the control valve. When no load is applied to the valve stem 86 from the diaphragm, the normal bias of the control spring holds the valve body 78 in its closed position against the valve seat 80, as illustrated in FIG. 4. In one embodiment, the control valve 38 can be a throttle valve or shut-off valve known in the art as a Schrader valve.

The load cell housing also has an air pressure return passage 90 extending from the underside of the housing, through the housing and through a peripheral portion of the recess 44 in the top surface of the housing. The air pressure return passage thus opens into the diaphragm volume below the outer periphery of the diaphragm. An internally threaded lower portion 92 of the return passage 90 is adapted to receive an elbow fitting 94 (see FIG. 2) for coupling the air return line 40 to the load cell housing. Thus, air pressure present in the diaphragm volume can be transmitted directly from the load cell housing through the air pressure return line 40.

FIG. 3 schematically illustrates a control panel 96 from which the load cell can be remotely operated. A supply of air under pressure at 98, such as a standard 120 psi shop air supply, is supplied to the control panel through a line 100. The supply pressure from the line 100 flows through a filter 102 on the control panel. The filter can be a standard air filter such as a filter identified as military part number AN (Army-Navy) 6235-2A. The air is filtered because the load cell is used in a dusty environment such as with dry cement, barite, and the like. In some cases a dessicater may be needed to avoid condensate from a non-dry air source. The filter keeps particulates out of the control valve so as to ensure the accuracy of the load cell measurement. The filtered air pressure supply passes through a line 104 to an ON/OFF valve 106 mounted on the control panel. The valve can be a standard ON/OFF valve known in the art as a Hoke valve. From the ON/OFF valve, the air pressure passes through a line 108, through an elbow fitting 110, and then from the control panel to the load cell through the air pressure supply line 36. From the control panel, the air pressure supply is ducted through the tank wall through a standard military aircraft bulkhead fitting 112. At the load cell, the air pressure supply in the supply line 36 is ducted to the diaphragm volume through the control valve 38. The return air pressure in the return line 40 is ducted through the tank wall through a standard aircraft bulkhead fitting 114. The return air pressure line then passes to the control panel through a fitting 116 and then to a line 118 on the control panel. The diaphragm pressure is led from the line 118 to a pressure gauge 120 on the control panel. The pressure gauge can be a standard air pressure gauge known in the art as an Ashcroft gauge. The diaphragm pressure passes through an elbow fitting 122 that has been drilled to provide a constant diameter leak to atmosphere through a 0.020-inch diameter vent hole 124. The vent hole avoids leaving pressure on the system when not needed, both to conserve supply air and as a safety measure. It has been found that the "leak" should be as close to the load cell as practical, to avoid error due to pressure loss in connecting tubing. For very accurate readings, the bleed (leak) should be direct from the diaphragm volume to atmosphere, thus avoiding flow in line 40 and line 118 of FIG. 3.

The diaphragm is normally in a balanced horizontal or neutral position when there is no load acting down on the top face of the diaphragm. When a load from the bulk material in the tank acts down on the top face of the diaphgram, the diaphragm will deflect downwardly. The diaphragm will actively bottom-out on the load cell frame under an applied load. Any air pressure in the diaphragm volume has normally been exhausted through the vent hole 124 so that the diaphragm will be able to deflect downwardly under the load from the bulk material, without opposition from air pressure in the system. A vent to atmosphere, controlled by a valve, also could be used to reduce gas pressure in the diaphragm volume, and in the system, to atmospheric pressure before a reading is taken. When the diaphragm deflects downwardly, the control valve 38 is opened inasmuch as the valve element 78 is moved downwardly from the valve seat 80 by the diaphragm acting against the bias of the valve spring 84. Thus, prior to using the load cell to measure the weight of the bulk material, the control valve is typically in an open position under the weight of the bulk material.

In using the load cell, the ON/OFF valve 106 is opened so that air from the pressure source 98 can be introduced into the diaphragm volume of the load cell housing through the open control valve 38. The pressure gauge can be calibrated to give a zero reading initially even though air pressure (atmospheric) is present in the diaphragm volume initially. The diaphragm will remain bottomed-out and the control valve 38 will be open until diaphragm pressure is approximately equal to the hydrostatic load, then the diaphragm will move toward its neutral position and the valve will begin to "throttle". That is, as the air pressure enters the enclosed diaphragm volume, the pressure in the diaphragm volume rises, causing the diaphragm to move upwardly toward the supported bulk loading on the upper surface of the diaphragm. The stem 86 on the valve element 78 is positioned with respect to the diaphragm so that the valve element will move into the closed position of the valve when the diaphragm is moved to its neutral or balanced horizontal position under the continued increase in pressure within the diaphragm volume. Thus, the control valve closes when the diaphragm has moved to the balanced position under the correct balancing pressure being supplied to the diaphragm volume through the control valve. The resulting air pressure in the cavity below the diaphragm thus acts in opposition to the weight of bulk material applied to the diaphragm, and the amount of pressure required to balance the load indicates the amount of the bulk material supported by the diaphragm.

The air pressure in the cavity under the diaphragm is led to the pressure gauge, which can be calibrated to provide a reading proportional to the amount of bulk material sensed by the load cell, i.e., equal to the hydrostatic head of the bulk material. The balancing air pressure in the diaphragm volume is directly proportional to the height of bulk material above the load cell. The pressure gauge can be calibrated to provide a reading of the height of bulk material above the load cell. In one embodiment in which dry cement is contained in the storage tank, the load cell can be calibrated in feet of cement, with a density of 94 pounds per cubic foot used in the calibration. This provides the height of cement remaining in the tank as a direct reading on the gauge. This reading, when combined with the known cross-sectional area of the storage tank, and the density of cement will provide the weight of the cement contained in the storage tank.

Thus, the load cell system provides a constant flow of air through the system to the underside of the diaphragm as long as the ON/OFF control valve is actuated. The air pressure constantly builds up under the diaphragm in opposition to the weight sensed by the diaphgram until the resulting pressure, read on the gauge, is the pressure required to just balance the bulk load above the load cell diaphragm. At that point, a reading can be taken to determine the amount of material contained in the tank. The diaphragm in effect hovers at the balancing point. The air pressure slowly bleeds out of the system; and when another reading is desired, the ON/OFF valve is again actuated, the pressure in the system is allowed to build up to the balanced condition, and the reading is taken. Thus, pressure is in the system only when a reading is taken.

The invention is reasonably inexpensive to implement and quickly provides accurate readings.

The load cell system also can be adapted for measuring the contents of multiple storage tanks. For example, the amount of bulk material remaining in each of a number of storage tanks in a trailer or the like can be measured with multiple load cells connected to only one gauge. A separate load cell can be installed in the bottom of each storage tank on the trailer, and a single control panel mounted externally to the storage tanks can be connected to each load cell by tubing for the high pressure lines and for the low pressure signal lines. A manifolded selector valve system on the control panel can be used to supply pressure only to the load cell of the storage tank where a reading is desired. The selector valve for the particular tank being measured is actuated and a reading is taken on the gauge, and the valve is returned to the OFF position as soon as the reading is obtained. Air flows through the system only when a reading is being taken. This avoids leaving pressure on the system when not needed, both to conserve supply air and as a safety measure. The load cell diaphragm where the measurement was taken is vented to the atmosphere to avoid possible damage to the load cell diaphragm.

Although the invention has been described in the context of solid granular type bulk materials, other pumpable fluid-type materials, whether solids or liquids, can be measured with the load cell system.

What is claimed is:

1. A load cell system for measuring the amount of a fluid-type bulk material contained in a storage tank comprising: a housing for mounting in a lower portion of the storage tank; a flexible diaphragm mounted in the housing for exposing one side of the diaphragm to the load applied to it by the bulk material, the opposite side of the diaphragm being exposed to a fluid pressure chamber in the housing; a source of fluid under pressure; an inlet line from the fluid pressure source to the fluid pressure chamber in the housing; a control valve in the inlet line between the pressure source and the pressure chamber in the housing, the control valve being isolated from the contents in the storage tank by the diaphragm, the control valve having a movable valve element that opens or closes the inlet line in response to movement of the diaphragm, the diaphragm being movable under the load applied to it by the bulk material to move the valve element to an open position for allowing fluid pressure from the pressure source to pass through the inlet line and build up pressure in the fluid pressure chamber in the housing until pressure in the chamber is just sufficient to balance the load applied to the diaphragm which moves the diaphragm to a position causing the valve element to close the inlet line; means for detecting of pressure fluid build up in the chamber to provide a measurement proportional to the amount of bulk material exposed to the diaphragm; and a separate vent passage for allowing the fluid pressure built up in the chamber to be vented from the chamber to the exterior of the storage tank independently of the control valve and the inlet line.

2. Apparatus according to claim 1 in which the vent passage normally vents directly to the atmosphere.

3. Apparatus according to claim 1 in which the vent passage is a restricted passage allowing pressure built up in the chamber to normally leak slowly from the chamber.

* * * * *